Feb. 7, 1928.
A. MALE, CALLED MALE-FOSSE
MACHINE FOR STACKING BISCUITS
Filed Feb. 6, 1925
1,658,531
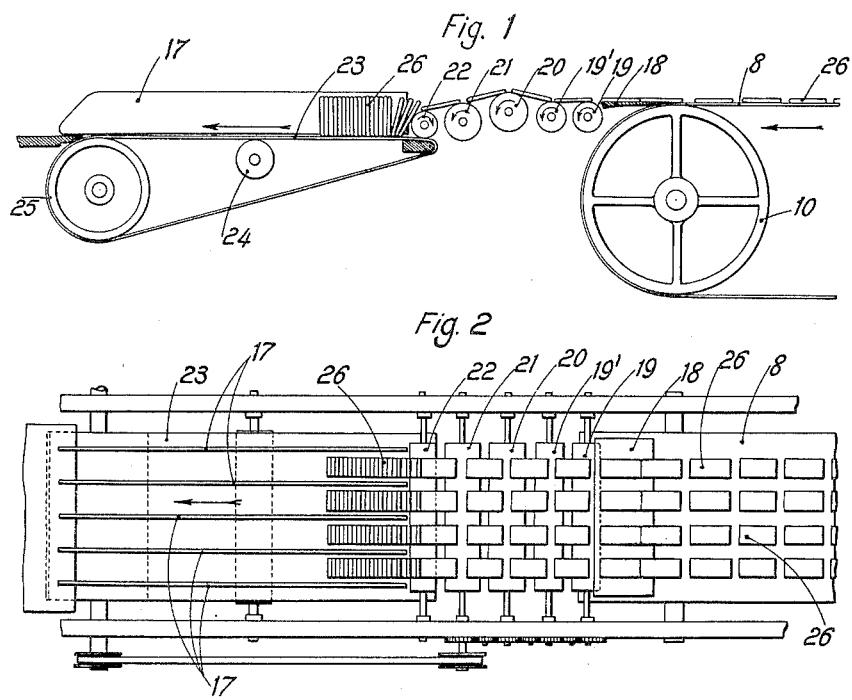
Inventor
André Male
By Marks & Clerk
Attys.

Patented Feb. 7, 1928.

1,658,531

UNITED STATES PATENT OFFICE.

ANDRÉ MALE, CALLED MALE-FOSSE, OF ARCUEIL, FRANCE, ASSIGNOR TO RENÉ MALE (CALLED MALE-FOSSE), OF ARCUEIL, FRANCE.

MACHINE FOR STACKING BISCUITS.

Application filed February 6, 1925, Serial No. 7,377, and in France May 13, 1924.

This invention relates to the type of machines in which an endless band on which the biscuits are received from a mould carried through a baking oven on the same endless band from which, according to the present invention, the biscuits are delivered onto an endless band in such position that any desired number of the said biscuits can be readily picked up and removed from the said band by hand for packing purposes.

These biscuits at the discharge end of the band are detached by a horizontal knife or scraper, then moved by rollers disposed at different heights which lead the biscuits and move them into a vertical position onto an endless band above which are disposed guide passages equal in number to the rows of biscuits on the band so that the biscuits may be automatically collected and assembled together ready for packing.

In the accompanying drawing:—

Figure 1 is a diagrammatic elevation showing the arrangement forming the subject matter of the invention.

Figure 2 is a plan of Figure 1.

The endless band 8 is extended by a knife or scraper 18 disposed in the same horizontal plane as the biscuits, the said knife or scraper acting to detach the biscuits in succession which operation is facilitated by the thrust exerted by the successive biscuits as they move on the band.

Immediately after the knife or scraper 18 are disposed the following mechanisms:

1. Two rollers 19 19' at the same height as the knife or scraper 18.

2. A roller 20 slightly raised relatively to the rollers 19 and 19' and a roller 21 situated approximately at the same height as the rollers 19 19'.

3. The rollers 19 19' 20 21 are driven in such manner that their direction of rotation may be the same as that of the pulley 10 which drives the endless band 8.

A roller 22 succeeding those above described is mounted a little below the roller 21 and is guided in the opposite direction to the rollers 19 19' 20 21 by frictional contact with an endless band 23 passing round the guide 24 and driven by a pulley 25 in the same direction as the band 8.

Above the endless band 23 are disposed guide passages 17 corresponding in number to the number of rows of biscuit moved by the endless band 8.

The action is as follows:—

The biscuits 26 carried by the band 8 are detached by the knife or scraper 18 by reason of the thrust of the successive biscuits on each other, the said biscuits being taken up by the rollers 19 19' which lead them onto the roller 20 which is slightly raised relatively to the preceding rollers. By the rotational movement of the roller 20, the biscuits are moved onto the roller 21 placed slightly below the roller 20, the aforesaid roller 21 delivering the biscuits onto the roller 22. In consequence of the rotation in the opposite direction of the roller 22 and the thrust exerted by the successive biscuits, the latter in their movement over the roller 22 are slightly tipped and fall onto the endless band 23 into an inclined position with their front faces disposed against the roller 22. In consequence of the thrust exerted by the successive biscuits in their uninterrupted movement due to the movement of the endless band 8, the biscuits come to rest successively between the immediate preceding biscuit and the roller 22. The endless band 23 moves them in the direction of the arrow gradually into a vertical position between the guide passages 17 from which as many as desired can be readily removed by hand for packing purposes.

The speed of the rollers 19 19' 20 21 and of the endless band 23 is determined in such manner relatively to the speed of the endless band 8 that no blocking at the entrances to the guide passages is produced and after the passage of the biscuits over the roller 22.

In the example above described the guide passages 17 have been shown horizontal but it is evident that they may be arranged in a manner analogous to that described for moving the biscuits in vertical guides without departing from the nature of the invention.

Claims:

1. In a device for stacking biscuits, in combination, an endless moving band adapted to receive biscuits from an oven in rows thereon, a drum around which said band passes, a horizontal scraper adapted to detach the biscuits due to the thrust of succeeding ones, rollers adjacent said scraper with their tops substantially at the same level as said scraper from which they receive said biscuits, additional rollers at different heights to receive said biscuits from said first mentioned rollers, all of said rollers rotating in the same direction as said drum, another roller rotating in the opposite direction, and a second moving endless band adjacent said last mentioned roller onto which the biscuits are deposited by said rollers.

2. In a device for stacking biscuits, in combination, an endless moving band adapted to receive biscuits from an oven in rows thereon, a drum around which said band passes, a horizontal scraper adapted to detach the biscuits due to the thrust of succeeding ones, rollers adjacent said scraper with their tops substantially at the same level as said scraper from which they receive said biscuits, additional rollers at different heights to receive said biscuits from said first mentioned rollers, all of said rollers rotating in the same direction as said drum, another roller rotating in the opposite direction, a second endless band driving said last-mentioned roller and adapted to receive the biscuits therefrom in a position inclined slightly from the horizontal.

3. In a device for stacking biscuits, in combination, an endless moving band adapted to receive biscuits from an oven, a drum around which said band passes, a second band moving in the same direction as the first but having its surface below the level of the first band, a scraper adapted to detach the biscuits from said first band due to the thrust of succeeding biscuits, a plurality of rollers between said scraper and the second band adapted to receive the biscuits from said scraper, said rollers being arranged at different elevations and rotating in the direction of said drum, a roller above and driven by said second band in a direction opposite to said other rollers and guides above said second band, the arrangement being such that the biscuits are deposited by said rollers on said second band between said guides, the faces of said biscuits abutting the faces of adjacent biscuits in stacked relation thereto.

In testimony whereof I hereunto affix my signature.

ANDRÉ MALE (called MALE-FOSSE).